(12) United States Patent
Tseng et al.

(10) Patent No.: US 8,297,830 B2
(45) Date of Patent: Oct. 30, 2012

(54) SLURRY SYSTEM FOR SEMICONDUCTOR FABRICATION

(75) Inventors: Chih-Chiang Tseng, Jhubei (TW); Yung-Long Chen, Xizhi (TW); Liang-Chieh Huang, Chiayi (TW); Yi-Wen Huang, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 578 days.

(21) Appl. No.: 12/397,906

(22) Filed: Mar. 4, 2009

(65) Prior Publication Data
US 2010/0224256 A1    Sep. 9, 2010

(51) Int. Cl.
B01F 5/10    (2006.01)
(52) U.S. Cl. .................................. 366/136; 366/159.1
(58) Field of Classification Search .............. 366/136, 366/159.1, 172.1, 173.1, 173.2
See application file for complete search history.

(56) References Cited

U.S. PATENT DOCUMENTS

| | | | |
|---|---|---|---|
| 5,803,599 A * | 9/1998 | Ferri et al. | 366/134 |
| 5,993,647 A | 11/1999 | Huang et al. | |
| 6,132,078 A * | 10/2000 | Lin | 366/153.1 |
| 6,196,526 B1 | 3/2001 | Lee et al. | |
| 6,604,849 B2 | 8/2003 | Lin et al. | |
| 7,331,844 B2 | 2/2008 | Tanoue et al. | |
| 2002/0186613 A1* | 12/2002 | Hiraoka et al. | 366/136 |
| 2003/0100247 A1 | 5/2003 | Kim et al. | |
| 2003/0158630 A1* | 8/2003 | Pham et al. | 700/285 |
| 2004/0052154 A1* | 3/2004 | Hiraoka et al. | 366/136 |
| 2007/0205214 A1* | 9/2007 | Roberts | 222/58 |

FOREIGN PATENT DOCUMENTS

| | | |
|---|---|---|
| CN | 101209542 A | 7/2008 |
| JP | 2000117636 A | 4/2000 |

OTHER PUBLICATIONS

Machine generated translation of JP 2000-117636A, generated Feb. 24, 2012.*
Official action issued Mar. 9, 2011 in counterpart Chinese application.

* cited by examiner

*Primary Examiner* — David Sorkin
(74) *Attorney, Agent, or Firm* — Frank J. Spanitz; Duane Morris LLP

(57) ABSTRACT

A slurry feed system suitable for chemical mechanical planarization (CMP) processes in a semiconductor fabrication facility and related method. The slurry feed system includes a valve manifold box having a discharge piping header fluidly connected to at least one CMP station and a first slurry supply train. The first slurry supply train may include a slurry mixing tank, day tank, and at least two slurry feed pumps arranged in series pumping relationship. The first slurry supply train defines a first slurry piping loop. In one embodiment, a second slurry supply train defining a second slurry piping loop is provided. The valve manifold box is operable to supply slurry from either or both of the first and second slurry piping loops to the CMP station.

11 Claims, 12 Drawing Sheets

SLURRY SYSTEM FOR SEMICONDUCTOR FABRICATION

FIELD OF THE INVENTION

The present invention generally relates to slurry systems, and more particularly to a slurry pumping system adaptable for use in semiconductor manufacturing.

BACKGROUND

Modern semiconductor electronic devices such as integrated circuit chips are formed by building multiple stacked layers of materials and components on a semiconductor substrate. The semiconductor devices typically incorporate numerous electrically active components which are formed on the substrate. Metal conductor interconnects, which may be made of copper in some embodiments, are formed by various additive patterning and deposition processes such as damascene and dual damascene to electrically couple the active components together by means of circuit paths or traces formed within one or more layers of dielectric material. Modern semiconductor fabrication entails a repetitive sequence of process steps including material deposition (conductive and non-conductive dielectric materials), photolithographic patterning of circuits in the dielectric material, and material removal such as etching and ashing which gradually build the stacked semiconductor device structures.

Chemical-mechanical polishing or planarization ("CMP") is a technique used in semiconductor fabrication for global planarization of the layers formed on the substrate in order to provide a uniform surface profile or topography upon which successive layers of materials may be built. As well known to those skilled in the art, CMP basically entails use of a polishing apparatus that is supplied with an abrasive chemical slurry which may contain an abrasive such as colloidal silicon dioxide or alumina, deionized water, and chemical solvents or oxidants such as hydrogen peroxide, potassium or ammonium hydroxide. The slurry is typically pumped under pressure to the CMP station by a slurry feed system and applied directly onto the surface of the semiconductor wafer. The slurry is then worked into the wafer surface by a rotating polisher pad or head to polish/plane the surface.

FIG. 1 is a diagram of a known slurry feed system 10 for storing and supplying slurry to a CMP station. As shown in FIG. 1, concentrated slurry is fed from supply drums 11 into a slurry mixing tank 12 where the slurry is mixed and diluted with deionized water and a chemical(s) such as $H_2O_2$ (hydrogen peroxide). The quantity of slurry and deionized water fed into the mixing tank 12 are measured using flow meters and/or scales to provide the desired proportions of each in creating the intended slurry blend. The diluted slurry is then piped to a pumping station consisting of two slurry feed pumps 13 arranged in parallel pumping relationship. The feed pumps 13 discharge into a common header and slurry is transferred to a valving switch box 14 comprising a plurality of valving and circuitous interconnecting piping branches for switching the slurry flow path to form two separate slurry supply piping loops A and B as shown. Recirculation piping 17 is provided to return slurry flow back to mixing tanks 12. In this embodiment, there is a second redundant/standby slurry supply system including generally a second slurry mixing tank 12 and parallel set of slurry supply pumps 13 which also feeds slurry to the valving switch box 14. The slurry flows from valve switching box 14 through either piping loops A and B to a valve manifold box (VMB) 15 which supplies slurry from either loops A or B (depending on which is being used) to the CMP station 16 for polishing/planing semiconductor wafers. The quality of the slurry to the CMP station may be monitored by instrumentation 18 operative to measure such slurry parameters as specific gravity and pH.

The foregoing known slurry feed system 10, however, has numerous operational and maintenance drawbacks. With parallel pumping arrangements as shown in FIG. 1, one drawback is that loss of one of the pumps 13 will cause a drop in the pressure and flowrate in the slurry feed system of sufficient magnitude such that the requirements of the CMP station 16 can no longer be met. Therefore, the redundant/standby slurry system 11 must be placed into service and the slurry system with the failed pump must be isolated for repair. The complex pumping and valving arrangement in valving switch box 14 makes this transition difficult to implement for fabrication plant operators when switching from one slurry supply system 11 to the redundant/standby slurry system for either pump repair or whenever routine maintenance of one of the slurry systems is required due to the large number of valves that require opening/closing to implement the switch. Furthermore, the circuitous piping arrangements in valving switch box 14 inherently creates numerous "dead legs" where stagnant flow allows slurry to accumulate and/or solidify. This creates problems with maintaining proper slurry concentrations and quality, in addition to creating potential plugging problems in the piping when the alternate unused loops must be placed into service for switching to the redundant slurry supply system 11.

Another drawback of the conventional slurry feed system 10 shown in FIG. 1 is instrument drift or shifting that occurs with the flow meters and/or scales used to measure the quantities of deionized water, chemicals, and slurry fed to the slurry mixing tank 12. This makes measuring the exact amounts of deionized water and slurry difficult which may adversely affect slurry quality and requires frequent maintenance to recalibrate these measurement instruments.

Another drawback of the conventional slurry feed system 10 shown in FIG. 1 is that the mixing tanks 12 are relatively small and have little reserve capacity such that a single day's supply of slurry for the CMP stations 16 cannot be accommodated by a single mixing tank 12. Accordingly, when one mixing tank 12 runs out of slurry and a new batch must be prepared, this cannot be done without removing the empty mixing tank from service. The slurry feed must be switched to the standby slurry feed system 11, which hopefully already has a batch of dilute slurry prepared and ready to supply the needs of the CMP stations 16. Otherwise, the semiconductor fabrication process is interrupted resulting in production time loss and higher fabrication costs. In addition, switching the slurry supply between mixing tanks in the operating and redundant/standby feed systems 11 must sometimes be done on a daily basis which is cumbersome to implement due to the many valve openings/closings that must be made by an operator in valving switch box 14 as already described above.

An improved slurry feed system is desired that minimizes or eliminates the foregoing problems with conventional slurry feed systems.

SUMMARY

A slurry feed system according to the present invention as described herein is intended to provide a more reliable, maintainable, and operable system than the foregoing known conventional design. A present embodiment provides a simplified slurry feed system characterized by simple design and operation, flexibility, and lower construction costs compared to known systems.

In one embodiment, a slurry feed system suitable for chemical mechanical planarization in a semiconductor fabrication facility is provided. The system includes: a valve manifold box comprising a plurality of valves and having a slurry discharge piping header fluidly connected to at least one chemical mechanical planarization station; a first slurry supply train comprising a first slurry mixing tank for preparing dilute slurry, a first day tank fluidly connected to the first mixing tank by first mixing tank discharge piping, at least two first slurry feed pumps arranged in series pumping relationship and connected by first pump suction piping to the first day tank, first pump discharge piping routed from the first slurry feed pumps to the valve manifold box, and first slurry return piping routed from the valve manifold box to the first day tank, the pump discharge piping and slurry return piping defining a first slurry piping loop, wherein the valves in the valve manifold box are interconnected with the first slurry piping loop in a manner that operably supplies slurry from the first slurry piping loop to the chemical mechanical planarization station.

In another embodiment, the slurry feed system may further include: a second slurry supply train comprising a second slurry mixing tank for preparing dilute slurry, a second day tank fluidly connected to the second mixing tank by second mixing tank discharge piping, at least two second slurry feed pumps arranged in series pumping relationship and connected by second pump suction piping to the second day tank, second pump discharge piping routed from the second slurry feed pumps to the valve manifold box, and second slurry return piping routed from the valve manifold box to the second day tank, the second pump discharge piping and second slurry return piping defining a second slurry piping loop, wherein the valves in the valve manifold box are interconnected with the second slurry piping loop in a manner that operably supplies slurry from the second slurry piping loop to the chemical mechanical planarization station. In some embodiments, the valves in the valve manifold box are preferably are configured and arranged in a manner that operably supplies slurry from either the first or second slurry piping loops to the chemical mechanical planarization station, or supplies slurry simultaneously from both the first and second slurry piping loops to the chemical mechanical planarization station.

A method for feeding abrasive slurry mixture to a chemical mechanical planarization station in a semiconductor fabrication facility is provided. The method includes: transporting diluted slurry mixture from a first mixing tank to a first day tank; pumping diluted slurry mixture from the first day tank using at least two first slurry feed pumps arranged in series pumping relationship through a valve manifold box and back to the first day tank to define a first slurry piping loop; transporting diluted slurry mixture from a second mixing tank to a second day tank; pumping diluted slurry mixture from the second day tank using at least two second slurry feed pumps arranged in series pumping relationship through the valve manifold box and back to the second day tank to define a second slurry piping loop; diverting diluted slurry mixture from either the first or second slurry piping loops to a slurry discharge piping header using the valve manifold box; and providing diluted slurry mixture from the slurry discharge piping header to a chemical mechanical planarization station.

According to another embodiment, a measuring tank having user adjustable volumetric capacities is provided suitable for use in measuring predetermined amounts of liquids used in the preparation of diluted abrasive slurry for chemical mechanical planarization polishing processes. Such liquid may include without limitation concentrated liquid slurry, deionized water, and chemicals. A measuring tank includes: a shell defining a reservoir having a volumetric capacity and a predetermined fill level; and a user positionable bottle disposed in the reservoir. The bottle is vertically movable in position above and below the fill level in one embodiment, wherein the bottle displaces varying amounts of liquid when added to the tank based on the position of the bottle to change the volumetric capacity of the reservoir.

BRIEF DESCRIPTION OF THE DRAWINGS

The features of the preferred embodiments will be described with reference to the following drawings where like elements are labeled similarly, and in which.

Figure 1:
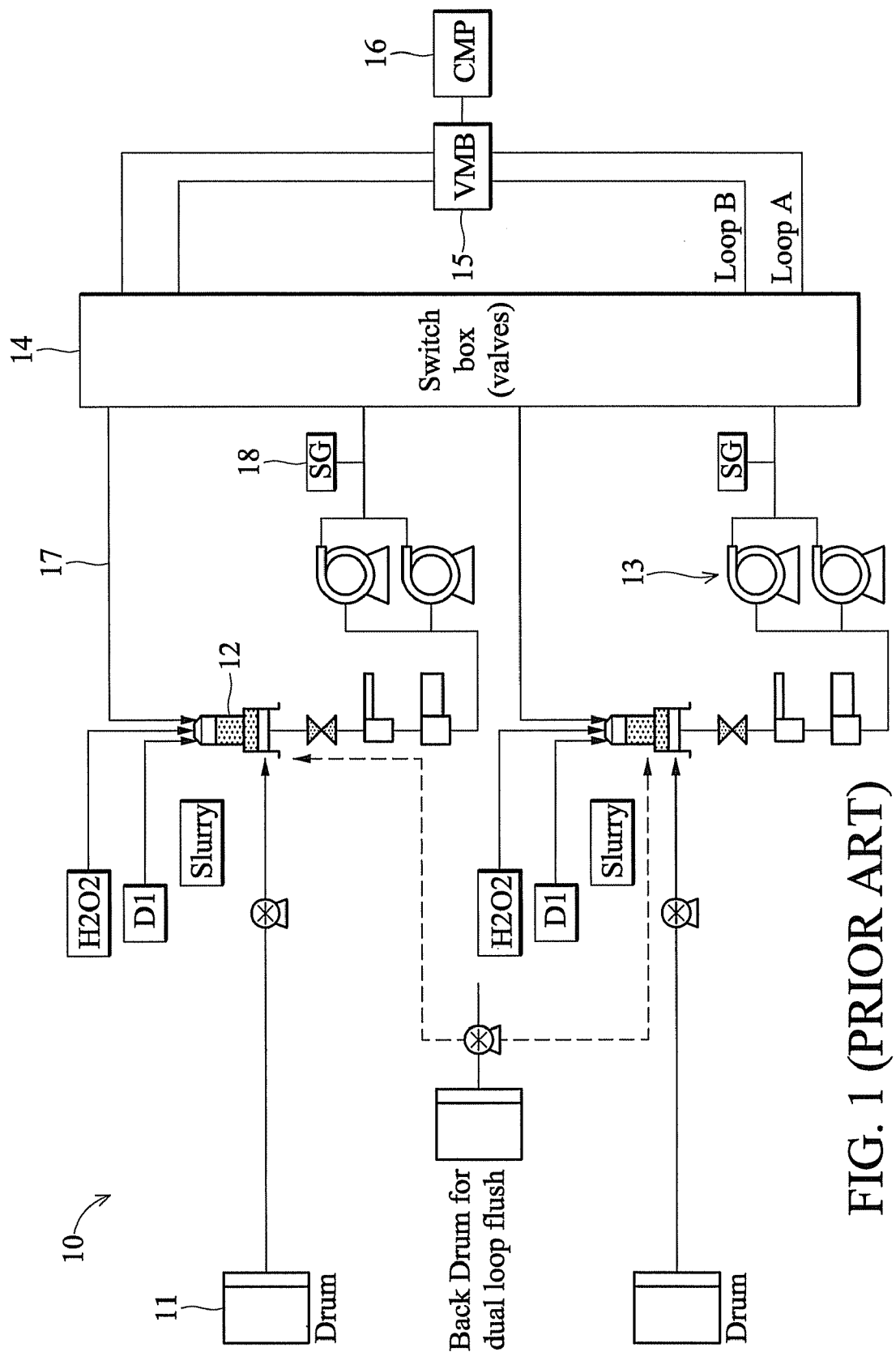
FIG. 1 is a schematic diagram of a known conventional slurry feed system.

All drawings are schematic and are not drawn to scale.

DETAILED DESCRIPTION

This description of illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise. The term "adjacent" as used herein to describe the relationship between structures/components includes both direct contact between the respective structures/components referenced and the presence of other intervening structures/components between respective structures/components. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

As used herein, the terms "line," "piping," and "tubing" are used interchangeably and refer to any type, size, or configuration of flow conduit conventionally used in the art for transporting liquids (including slurries) and/or gaseous materials and combinations thereof.

Figure 2:
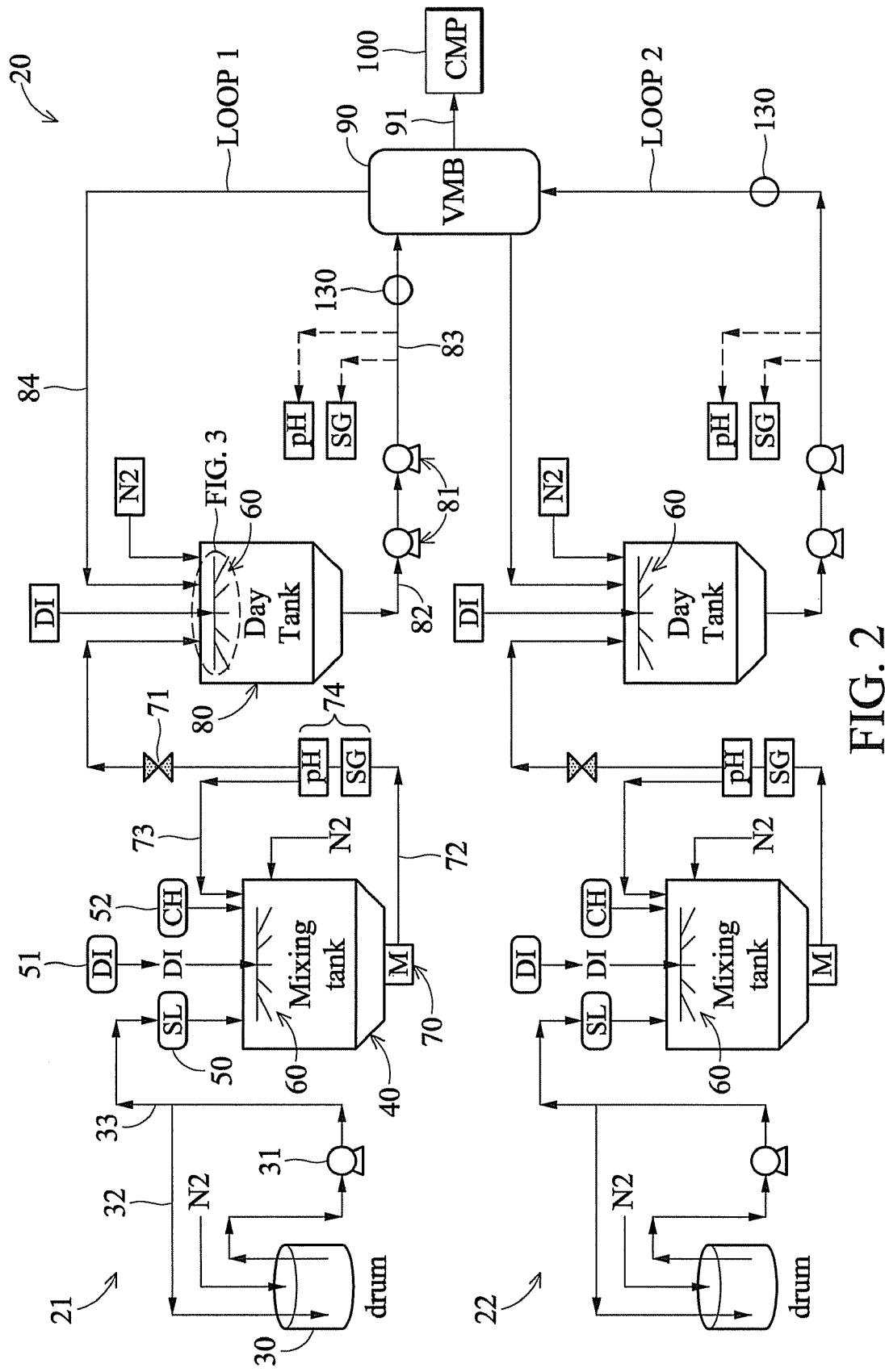
FIG. 2 is a schematic diagram of one embodiment of a slurry feed system according to the present invention.

Referring to FIG. 2, a slurry feed system 20 according to one embodiment of the present invention includes a first slurry supply train 21 and a second redundant/standby slurry supply train 22 to provide reliability and operational flexibility in the slurry feed system. Slurry supply train 21 includes a slurry supply drum 30 containing undiluted concentrated slurry, a slurry transfer pump 31 taking suction via piping from drum 30 for transporting the slurry to a mixing tank 40, and recirculation piping 32 for recirculating the transfer pump discharge back to the drum. Slurry supply train 21 further includes a slurry day tank 80 which is preferably sized to meet at least the daily quantity of diluted slurry needed by the CMP stations 100 and slurry feed pumps 81 taking suction from day tank 80 via pump suction piping 82. Slurry feed pumps 81 discharge transport slurry via pump discharge piping 83 to a conventional valve manifold box 90 (VMB) containing valving and associated piping branches (not shown) to supply dilute slurry from day tank 80 to CMP stations 100 for polishing/planing semiconductor wafers. Slurry return piping 84 is provided for returning some or all of the slurry from valve manifold box 90 to day tank 80 depending on whether slurry is being demanded by the CMP stations 100. Slurry supply train 22 contains components corresponding to the previously described components of slurry supply train 21, and slurry supply train 22 also interfaces with valve manifold box 90. Slurry feed pumps 81, discharge piping 83, and return piping 84 of slurry supply train 21 define a first slurry piping loop 1 and the corresponding components in slurry supply train 22 define a second slurry piping loop 2 separate from the first slurry loop. Both slurry piping loops preferably flow through valve manifold box 90 and interconnect with valving in the valve manifold box in a manner further described herein.

Figure 13:
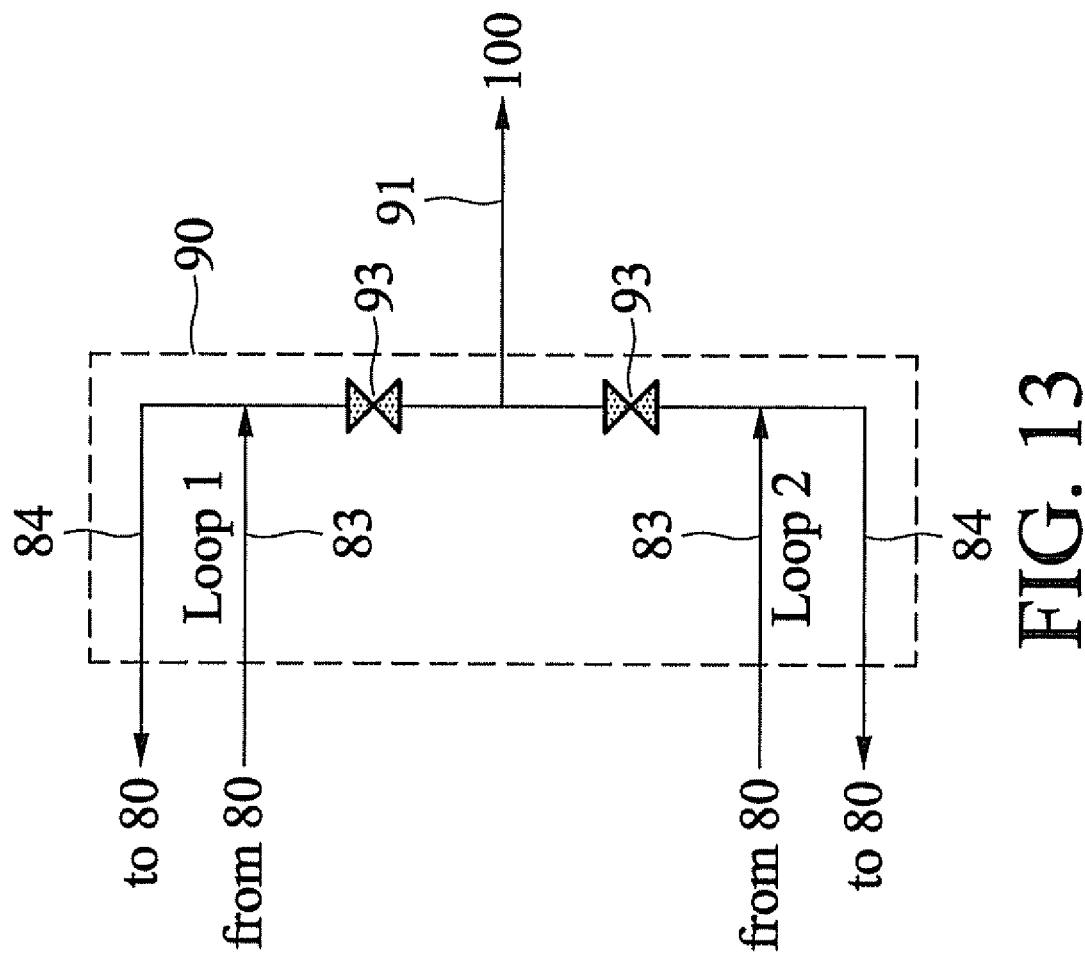
FIG. 13 is a schematic diagram of a valve manifold box usable in the slurry feed system of FIG. 2.

Preferably, a single conventional valve manifold box 90 as shown in FIG. 2 is provided to allow switching the slurry source from either slurry supply trains 21 or 22 to feed slurry the CMP stations 100. The valving and associated piping branches in conventional valve manifold box 90 are configured and adapted accordingly to operably isolate or allow slurry flow from either first slurry piping loop 1 associated with slurry supply train 21 or second slurry piping loop 2 associated with slurry supply train 22 to a common CMP station supply discharge piping header 91 for feeding dilute slurry to the CMP stations 100 for polishing semiconductor wafers. In some embodiments, valve manifold box 90 may be operable to provide slurry flow from both slurry supply trains 21 and 22 to the CMP stations 100 via valve manifold box discharge piping header 91. In one possible embodiment, valve manifold box 90 may simply comprise a single isolation valve 93 in each of the first and second slurry loops which fluidly connects to discharge piping header 91 via a short section of piping as shown in FIG. 13. Other suitable piping and valving arrangements may be provided so long as the foregoing functionality is provided for switching or combining slurry flow to the CMP stations 100.

With continuing reference to FIG. 2, undiluted concentrated slurry is transported to slurry mixing tank 40 via piping 33 for preparing a dilute slurry mixture to meet the CMP requirements of the semiconductor fabrication process. Accordingly, mixing tank 40 combines the undiluted slurry with deionized water (DI) and a chemical or chemicals (CH) such as $H_2O_2$ in some embodiments to form a dilute slurry mixture suitable for use in the CMP stations. Mixing tank 40 may be any suitable size, such as for example 200 liters in one exemplary representative embodiment, depending on the specific application requirements. In lieu of using scales and/or flow meters as in conventional systems described herein with reference to FIG. 1, the quantity of undiluted slurry and deionized water fed into mixing tank 40 and chemicals may each be measured using a slurry measuring tank 50, a deionized water measuring tank 51, and a chemical measuring tank 52 as further described herein.

Figure 4:
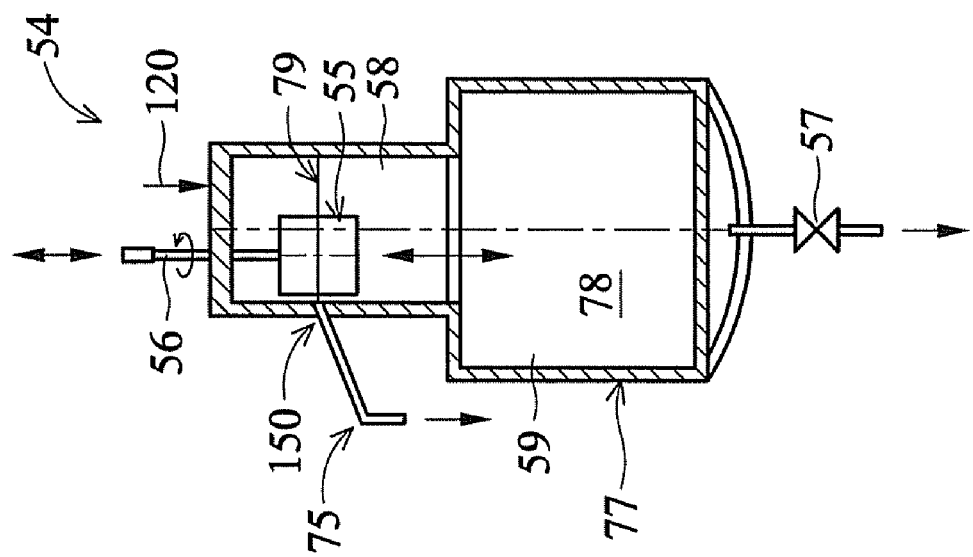
FIG. 4 is a cross-section side view of measuring tank usable in the slurry feed system of FIG. 2.

FIG. 4 is a schematic diagram of one embodiment of a user-adjustable measuring tank 54, which may be used for slurry measuring tank 50, deionized water measuring tank 51, and/or chemical measuring tank 52 as shown in FIG. 2. In one embodiment, measuring tank 54 may include a shell 77 defining an internal reservoir 78, which in one embodiment may include large lower reservoir 59 and a relatively smaller upper reservoir 58 in fluid communication with the upper reservoir as shown. Measuring tank 54 may be of any suitable size, volumetric capacity, and configuration. The shell 77 thus defines a fixed total volumetric capacity for measuring tank 54. Measuring tank 54 may have a closed top as shown in FIG. 4 which may be fixed or openable/closeable, or in other embodiments may have an open top.

In lieu of monitoring/regulating the flow of slurry or deionized water added to mixing tank 40 on an instantaneous basis as in conventional systems using scales or flow meters with their inherent instrument drift problems described herein with reference to FIG. 1, the measuring tank 54 in some embodiments advantageously allows the required proportions of slurry, chemicals, and deionized water to instead be pre-measured on a volumetric basis and then added to mixing tank 40 on a batch basis without instrumentation. Referring to FIG. 4, therefore, measuring tank 54 preferably includes a means for adjusting the volumetric capacity of the liquid stored therein, which could be slurry, deionized water, a chemical, or another liquid used in preparing the dilute slurry. In one embodiment, the adjusting means may be provided by a user adjustable or positionable bottle 55. In some possible embodiments, bottle 55 is adjustable in position via a rod which in one embodiment may be a user-rotatable threaded adjustment rod 56 located inside measuring tank 54. In other embodiments, adjustment rod 56 may be unthreaded and slidable in position with an appropriate locking or clamping mechanism provided to fix the rod in the selected position and hence bottle 55 as well. In the threaded embodiment, however, a user rotates rod 56 wherein the position of the bottle 55 is vertically adjustable (i.e. raised or lowered) with respect to measuring tank 54. The bottle 55 is adjustable between a first lower position and a second upper position. The vertical range of adjustment for bottle 55 is limited by the height of the measuring tank 54 and length of rod 56 that is provided.

Preferably, the bottle may be generally disposed inside upper reservoir 58 of measuring tank 54 as shown in FIG. 4. Bottle 55, which may be solid or hollow and sealed to reduce weight, has a volume that is capable of displacing at maximum an equal volume of the liquid being held in the measuring tank 54 by immersion in the liquid. That is, the bottle consumes space inside measuring tank 54 that may otherwise be filled by the liquid which is added to the tank. By positioning the bottle 55 to varying degrees of being either fully above the liquid surface at the fill level 79 inside mixing tank 54, partially immersed in the liquid to varying degrees, or completely submerged in the liquid, a corresponding amount of the liquid volume will be displaced from the measuring tank. This allows the internal "working" volumetric capacity of the mixing tank 54 to be adjusted depending on the predetermined proportions required for slurry, chemicals, and deionized water to be combined in mixing tank 40. In one possible embodiment, the bottle may have a cylindrical shape; however, other suitable shapes may be used. It is well within the ability of those skilled in the art to determine an appropriate size and corresponding volumetric capacity for both the bottle 55 and measuring tank 54 based on the approximate amount of liquid (i.e. slurry, deionized water, chemical, etc.) required for the diluted slurry preparation process and the range of adjustment typically required for the various constituents needed for the diluted slurry.

When measuring tank 54 is used as slurry measuring tank 50, a deionized water inlet tubing or piping 120 may be provided to introduce deionized water into the tank. In some embodiments, water piping 120 may be located on the top of tank 50 and be horizontally offset from adjustment rod 56 as shown in FIG. 4. Water inlet piping 120 may be used for periodic cleaning of slurry measuring tank 50 to remove slurry residue or buildup in the tank.

In operation, with reference to FIGS. 4-7, once the required proportions of slurry, deionized water, and chemical(s) are determined, the bottles 55 in measuring tanks 50, 51, 52 respectively may be adjusted and set in position to their corresponding desired volumetric capacities. In one possible embodiment, measuring tanks 50, 51, 52 may be filled until the liquid contents of each respective tank overflows and discharges through an overflow line 75 as the liquid surface in each tank rises and exceeds the height where overflow line 75 is connected to the tank at connection location 150 (see FIG. 4). The overflow line 75 connection location 150 on the side of measuring tank 54 therefore defines a maximum liquid fill level 79 for measuring tank 54 and a corresponding "working" volumetric capacity as opposed to the total volumetric capacity defined by shell 77 of measuring tank 54. In other possible embodiments, overflow line 75 may be omitted and maximum liquid fill level 79 may be defined by visual markings on measuring tank 54 or via level detection sensors mounted in tank 54. In one possible embodiment shown in FIG. 4, bottle 55 is positioned so the overflow line 75 connection location 150 is approximately half-way up the height of bottle 55 with the bottle being partially immersed in the liquid (see liquid fill level 79). After an overflow condition is observed via overflow line 75, the addition of undiluted slurry, deionized water, or chemical(s) to the measuring tank 54 is stopped. Although slurry measuring tank 50, deionized water measuring tank 51, and chemical measuring tank 52 may have the same total fixed size and volumetric capacity, the bottles 55 in each respective tank may be adjusted in position to provide different volumetric capacities for each measuring tank based on the position of bottles in each tank and the amount of each respective liquid to be added to the measuring tanks.

It will be appreciated that in some embodiments, user adjustable measuring tanks 54 may be used for some or all of the slurry, chemicals, and deionized water. In one embodiment, a fixed volume of slurry may be used while adjustable measuring tanks 54 may be used for the chemicals and deionized water to vary these additives based on a standard amount of slurry typically used to prepare the dilute slurry mixture in mixing tank 40. It should be recognized that adjustable measuring tanks 54 may be used in either an adjustable volume or fixed volume mode of operation.

Figure 5:
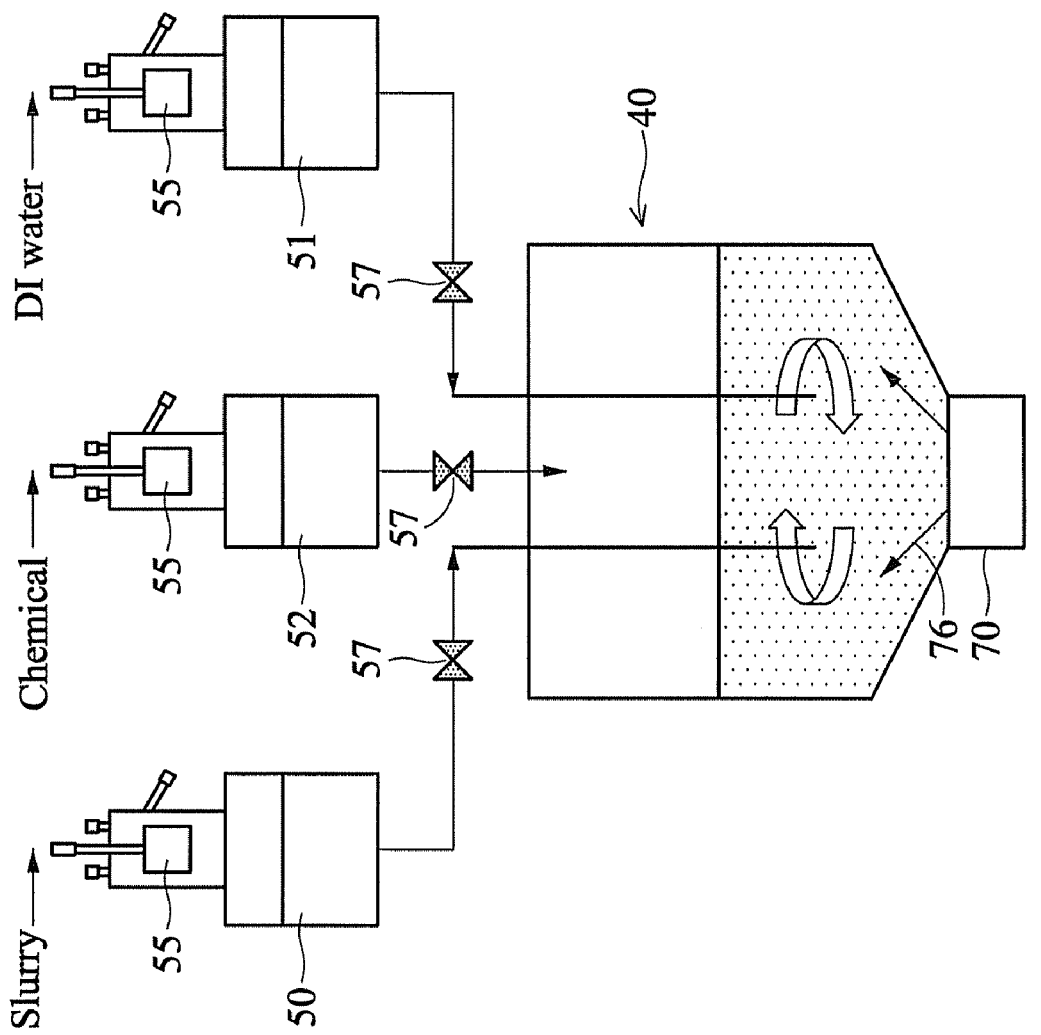
FIGS. 5-7 are schematic diagrams of a slurry mixing tank with measuring tanks showing one embodiment of an operational sequence for preparing a dilute slurry mixture.
Figure 6:
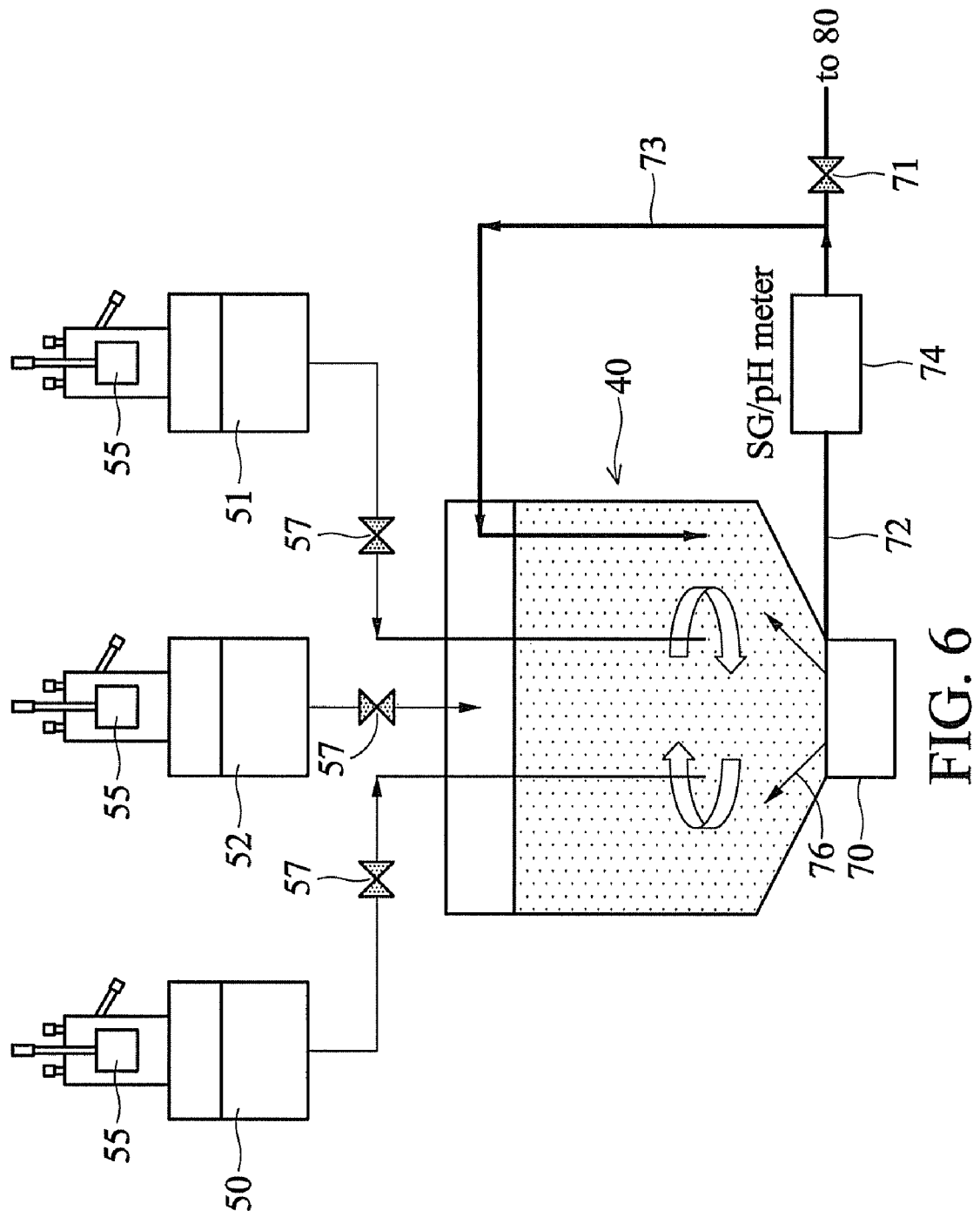
Figure 7:
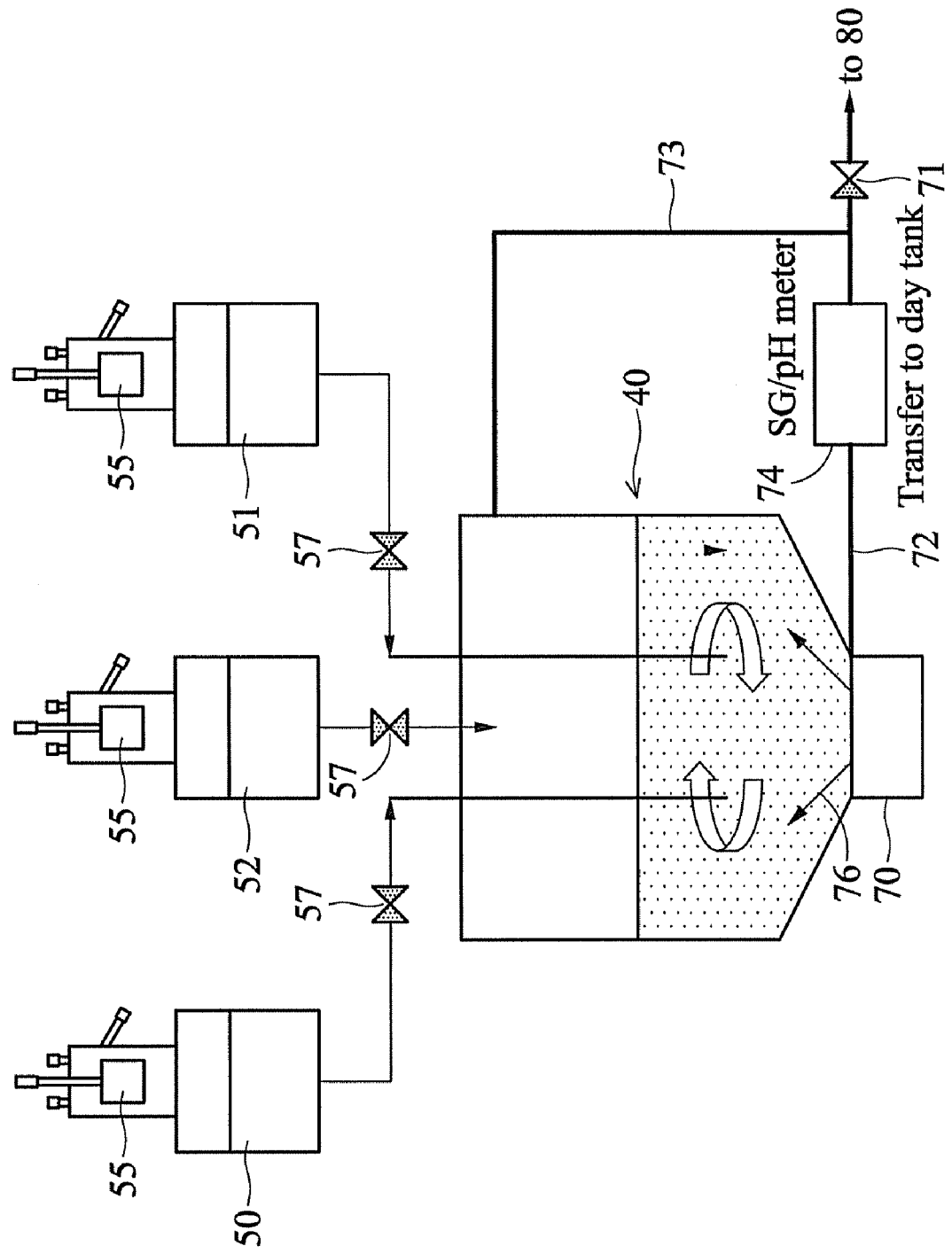

FIGS. 5-7 illustrate a sequence of process steps for preparing a batch of dilute slurry using mixing tank 40 and measuring tanks 54 such as slurry measuring tank 50, deionized water measuring tank 51, and chemical measuring tank 52. In this exemplary embodiment, slurry measuring tank 50 is used in fixed volume mode with no adjustment being made in the volumetric capacity via positioning of the bottle 55. If the same amount of slurry will always be used in mixing tank 40, the same amount of concentrated slurry may always be used so that a slurry measuring tank 50 without an adjustable bottle 55 may be used. First, bottles 55 in measuring tanks 51 and 52 are adjusted in position and set to their desired volumetric capacities based on the required proportions of chemicals and deionized water needed for slurry mixture. The volume of slurry measuring tank 50 is set at maximum capacity if a measuring tank with an adjustable bottle 55 is used. In one exemplary embodiment, slurry measuring tank 50 may have a volumetric capacity of approximately 15 L and deionized water measuring tank 51 may have an adjusted volumetric capacity of approximately 22 L. Referring to FIG. 5, the slurry, deionized water, and chemical measuring tanks 50, 51, and 52 respectively are each filled to a fill level 79 in each tank (see also FIG. 4). A discharge isolation valve 57 in piping or tubing between the measuring tanks 50, 51, and 52 and the slurry mixing tank 40 remain closed while each tank is filled. Valves 57 are then opened and the entire contents of the slurry, deionized water, and chemical measuring tanks 50, 51, and 52 respectively are emptied into mixing tank 40 for preparing the dilute slurry mixture. The flow of effluent from measuring tanks 50, 51, and 52 preferably is driven by gravity, but in certain physical plant layouts, pumps may be used to transfer the effluent to mixing tank 40 if required. As slurry mixing tank 40 is filled, the mixture of slurry, deionized water, and chemical may be agitated and blended using a pump-tank mixer 70 further described herein which also serves to transport dilute slurry to day tank 80.

Referring to FIG. 6, when the contents of the measuring tanks are added to slurry mixing tank 40, pump-tank mixer 70 is operated preferably with shutoff valve 71 in mixing tank discharge piping 72 being in a closed position to isolate the mixing tank from slurry day tank 80 (see also FIG. 2). Referring to FIG. 6, the contents of mixing tank 40 are recirculated back through the tank through recirculation piping 73 using pump-tank mixer 70. Preferably, specific gravity SG and pH measurement instrumentation 74 is used to check the quality of the dilute slurry. Once the quality (e.g. specific gravity and pH) of the dilute slurry has been determined to be within an acceptable range for semiconductor wafer polishing in the CMP station thereby meeting specification, the dilute slurry is ready to be transported to slurry day tank 80 (FIG. 2) as shown in FIG. 7 when the day tank demands more slurry based on the level of slurry remaining in the day tank. In one embodiment, control signals and/or alarm signals may be generated from level detection instrumentation (e.g. level probes or sensors) which may be included in day tank 80 to automatically monitor the level of slurry in the day tank. These signals may trigger valve 71 to automatically open or alert operating personnel to manually open valve 71 for filling day tank 80 with slurry. If day tank 80 does not require more dilute slurry at present to meet the demands of the CMP stations, valve 71 remains closed and the slurry continues to recirculate through mixing tank 40 via pump-tank mixer 70 to maintain slurry quality until needed. When slurry is demanded by day tank 80 and mixing tank 40 is empty, a new batch of dilute slurry is prepared in the same manner by repeating the foregoing steps.

According to another aspect of the invention, a wet gas blanketing system such as a wet $N_2$ (nitrogen) or clean dry air (CDA) system commonly used the semiconductor industry may be employed in slurry feed system 20 to maintain slurry quality for reasons as described in U.S. Pat. No. 6,196,526, which is incorporated herein by reference in its entirety. In slurry storage/supply tanks used for slurry feed systems for chemical mechanical polishing, a wet blanket must be used to protect the slurry particles from drying out. $N_2$ or clean dry air (CDA) gas typically has low relative humidity (e.g. between about 20% and about 30% RH) which is not suitable for blanketing slurry tanks due to its drying effect on the slurry. When $N_2$ gas or CDA alone with a low RH is used, some of the slurry particles tend to dry up and adhere to other particles to form particle clumps larger in size than desired. This presents potential significant scratching problems when the slurry solution is subsequently dispensed on a wafer surface for polishing. The use of a wet $N_2$ or CDA gas blanket over a slurry solution in the slurry tank is therefore important in assuring the reliability of the CMP process.

Figure 8:
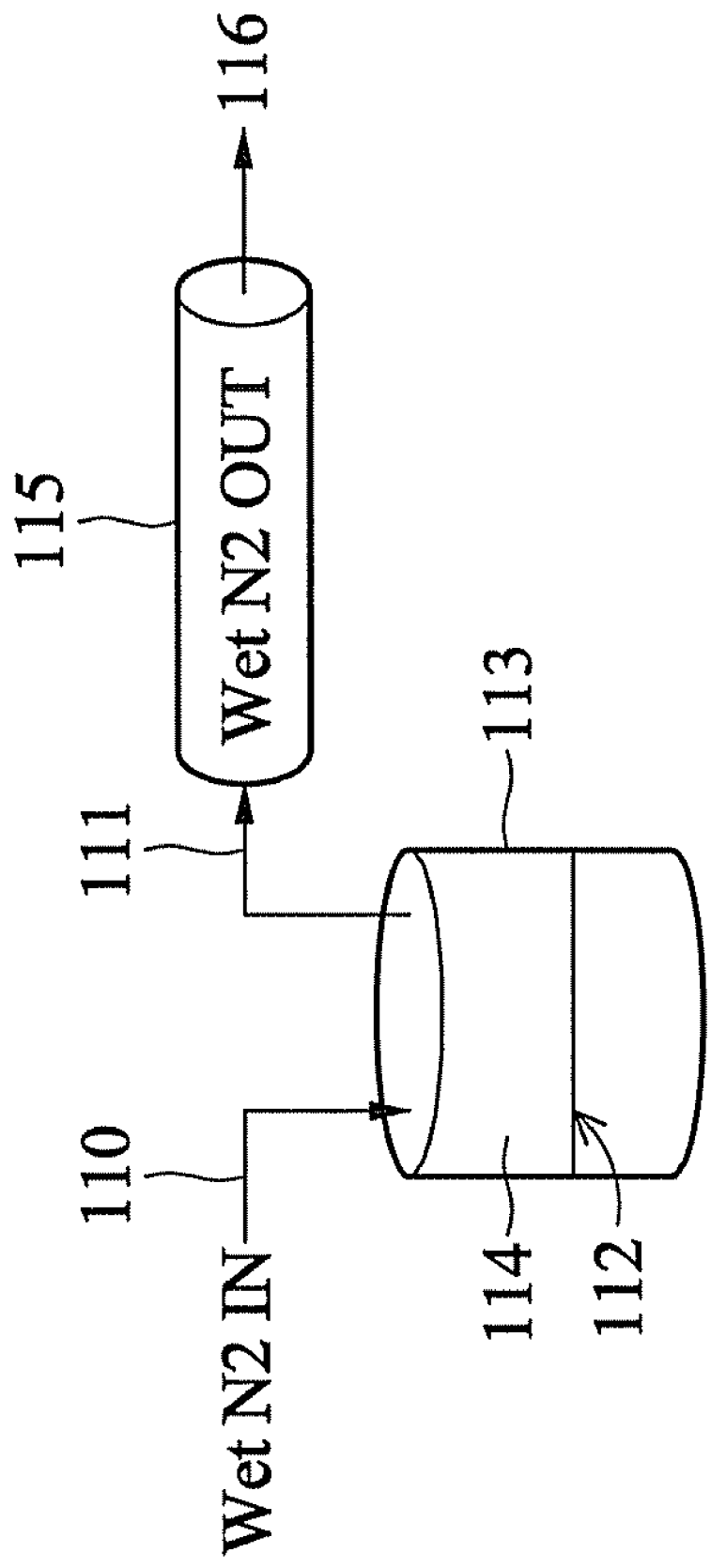
FIG. 8 is a schematic diagram of one embodiment of a wet gas blanketing system usable in the slurry feed system of FIG. 2.

Referring to FIG. 8, an improved wet blanketing system is provided for use in blanketing a slurry container or tank 113. In one preferred embodiment, the wet blanketing system may be a wet $N_2$ system is used. In a preferred embodiment of slurry feed system 20, wet $N_2$ blanketing is provided for slurry drums 30, slurry mixing tank 40, and slurry day tanks 80. In other embodiments, however, wet CDA blanketing systems may alternatively be used. FIG. 8 diagrammatically shows a generic slurry container or tank 113 which may represent slurry drums 30, slurry mixing tank 40, and slurry day tanks 80 in some embodiments. Wet N2 is produced by a conventional wet $N_2$ generator, such as those described in U.S. Pat. No. 6,196,526. Wet $N_2$ consisting primarily of $N_2$ gas having a high moisture content or relative humidity, preferably higher than 30%, is introduced under positive pressure (e.g. between 0 to about 1 psi preferably) into the top of mixing tank 40 and/or day tank 80 in the dead space 114 above the surface 112 of the slurry. In prior known sealed type designs, only an inlet 110 was provided to supply wet $N_2$ which was periodically injected into the slurry tank or other container creating a stagnant blanket of sealed or trapped wet $N_2$ in the dead space of the tank above the slurry. The wet $N_2$ in these known systems is transferred by the principle of diffusion into the slurry gradually decreasing the level of $N_2$ in the tank over time. The degree of reduced wet $N_2$ concentration can be determined such as by measurement or pressure monitoring.

According to the present invention, however, a wet $N_2$ system is provided that allows wet $N_2$ in one embodiment to be circulated continuously through slurry drums 30, slurry mixing tanks 40, and slurry day tanks 80 as shown with reference to FIGS. 2 and 8. A wet $N_2$ discharge outlet 111 is provided that allows the wet N2 to flow through the slurry drums 30, mixing tanks 40, and day tanks 80. The discharge outlet 111 is connected to exhaust piping 115 under negative pressure that establishes wet $N_2$ flow through these foregoing slurry vessels. The negative pressure may be created by a conventional blower, vacuum pump, or other suitable means 116 connected to exhaust piping 115. Since the wet $N_2$ is transferred preferably continuously to the slurry vessels 113 by pressure differential, the wet $N_2$ concentration in the discharge flow will be homogenized. Drops in wet N2 levels are most likely to occur when empty slurry supply drums 30 are switched out for new slurry drums 30 allowing for contact with outside air. The wet N2 design according to the present invention, however, can quickly recover and re-establish normal wet N2 moisture levels in the new slurry drum 30 to minimize the risk of the slurry drying out during drum changing.

Figure 3:
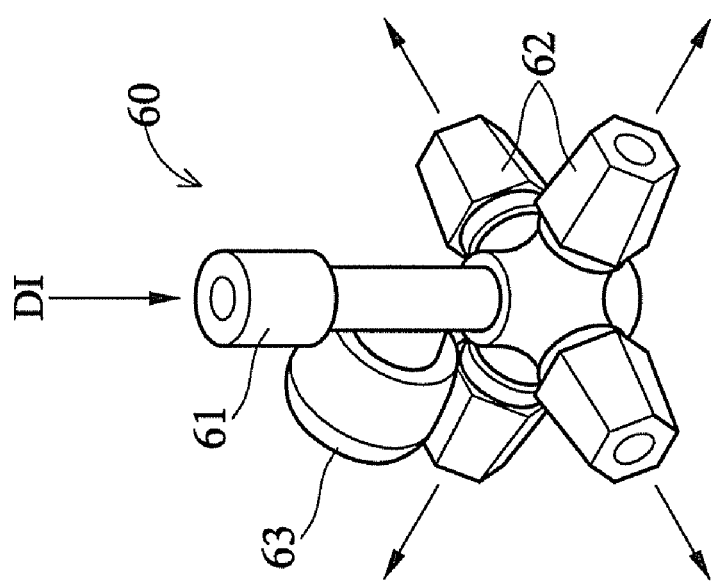
FIG. 3 is a perspective view of a deionized water injection nozzle for a tank blanketing system usable in the slurry feed system of FIG. 2.

For typically larger slurry containers, such as slurry mixing tanks 40 and slurry day tanks 80, an additional source of moisture may be provided in conjunction with the wet $N_2$ system to help prevent the slurry from drying out. In one embodiment, referring to FIGS. 2 and 3, atomized deionized water may be added to slurry mixing tanks 40 and slurry day tanks 80 for such a purpose. Accordingly, slurry mixing tanks 40 and slurry day tanks 80 may each include a multiple outlet port deionized water injection nozzle 60 as shown in FIG. 3 to introduce atomized deionized water into these vessels. Preferably, water injection nozzles 60 are mounted in the top of slurry mixing tanks 40 and slurry day tanks 80 to introduce the atomized water above the slurry. In one embodiment, water injection nozzle 60 may include a deionized water inlet port 61 and multiple outlet ports 62 which may be of any suitable number and arrangement to evenly distribute atomized deionized water throughout slurry mixing tanks 40 and slurry day tanks 80. In one embodiment, without limitation, four outlet ports may be provided. Water injection nozzle 60 may include a shutoff valve 63, which may be manually controlled by operating personnel or remotely controlled automatically via a PLC in some embodiments to periodically inject wet $N_2$ into the slurry tanks. The water injection nozzle 60 may be periodically operated to inject atomized deionized water to the slurry tanks. In one possible embodiment, for example, deionized water may be injected into the slurry tanks on a cycle of two (2) seconds ON per every two (2) hours OFF.

With reference to FIGS. 2 and 5-7, combination pump-tank mixer 70 in one embodiment which is coupled to the bottom of slurry mixing tank 40 may be a bearing-less magnetically levitated impeller type slurry pump mixer such as a Levitronix® MagLev pump tank mixer available from Levitronix LLC of Waltham, Mass. Preferably, pump-tank mixer 70 combines the functions of agitating/mixing the contents of slurry mixing tank 40 and transporting the dilute slurry to day tank 80. The mixing is provided by returning a portion of the slurry from the pump impeller back into the bottom of tank 40 through a plurality of orifices in a top housing of the pump which couples to the bottom of mixing tank 40 to define pressurized slurry agitation jets 76 (see, e.g. FIGS. 5-7 flow arrows). The return slurry flow agitates the contents of mixing tank 40 to provide the required mixing action. Pump-tank mixer 70 may include an associated PLC and control circuitry adapted to control operation of the pump-tank mixer.

It should be noted that because pump-tank mixer 70 attaches directly to the bottom of slurry mixing tank 40, there advantageously is no "dead" piping leg between the tank and the pump-tank mixer as in the conventional known system shown in FIG. 1. Therefore, this eliminates a place where slurry may accumulated and clump or harden when mixing tank 40 is in standby mode and no dilute slurry mixture is being fed to day tank 80.

Referring to FIG. 2 again, slurry feed pumps 81 are preferably piped together in series pumping relationship or arrangement as shown in lieu of being piped in parallel as in the known prior conventional system described herein (see FIG. 1). In series pumping relationship, the suction of one of the slurry feed pumps 81 is fluidly coupled to the discharge of the other slurry feed pump 81 which takes suction from slurry day tank 80. As known to those skilled in the art, the total dynamic pressure or head (TDH) provided by pumps arranged in series is essentially additive so the total discharge pressure of both pumps is greater than that of a single pump alone because each pump operates at a successively higher head. Advantageously, if one of the feed pumps 81 fails, the remaining operational pump can still deliver sufficient head (pressure) and flow to meet the requirements of the CMP stations 100 albeit with some reduction in head and flow of the slurry supply train 21 or 22. The failed pump can be bypassed (via a conventional bypass piping/valving arrangement) so that the remaining pump may still be operated.

By contrast, when pumps are arranged in parallel relationship as in conventional slurry feed systems shown in FIG. 1, the total pressure or head provided by both pumps operating together is not additive and no higher than that provided by a single pump as known to those skilled in the art. The pumps take separate suction from the same source usually via a common suction header, and discharge into a common discharge header, as shown in FIG. 1. Each pump, however, operates at the same total dynamic head TDH. A failure of one of the parallel pumps in this arrangement results in a larger flow and pressure reduction than in series pump operation (according to the present invention) such that the operating pressure and flow requirements of the CMP stations may no longer be met.

The entire slurry supply train must therefore be taken out of service and slurry supply switched to the redundant/standby slurry feed system. This consumes precious time until operating personnel can make the changeover in operation resulting in a disruption of the semiconductor fabrication process or less than desired CMP performance.

In contrast to the prior conventional slurry feed system shown in FIG. 1 which combines the slurry mixing and storage/supply function in a single mixing tank 12, a slurry feed system 20 according to the present invention advantageously provides a separate dedicated mixing unit comprised of slurry mixing tanks 40 and storage/supply unit comprised of slurry day tanks 80, and all of their associated components. Accordingly, a new batch of dilute slurry may be prepared in slurry mixing tank 40 independent of the operation of the slurry day tank 80 all in a single slurry supply train 21 or 22.

An overview of the operation of the slurry feed system 20 according to the present invention, already described in part, will now be discussed. Referring to FIG. 2 and slurry supply train 21 or 22, undiluted abrasive slurry for use in CMP is initially transported from supply drum 30 to mixing tank 40 via slurry transfer pump 31. The slurry is mixed with predetermined amounts of chemical(s) and deionized water in mixing tank 40 preferably using measurement tanks 50, 51, 52 in the manner already described herein. The slurry mixture in the mixing tank 40 is blended by pump-tank mixer 70 to homogenize the mixture and prepare the dilute slurry required for CMP stations 100. Advantageously, pump-tank mixer 70 eliminates the need for separate mechanical impeller-type mixers thereby avoiding additional capital and maintenance costs. Pump-tank mixer 70 is used to recirculate the slurry mixture from mixing tank 40 back through the tank while the slurry quality is checked via pH and specific gravity monitoring instrumentation 74. When the slurry meets specification, the dilute slurry mixture can be transported to day tank 80 via pump-tank mixer 70 as needed. In one embodiment representative embodiment, day tank 80 may have a volumetric capacity of approximately 500 liters while mixing tank 40 may have a capacity of approximately 200 liters. Slurry from day tank 80 is then transported to valve manifold box 90 for distribution to CMP stations 100. The slurry may recirculated on a continuous basis in some embodiments from day tank 80 through valve manifold box 90 (via slurry feed pumps 81) and back to day tank as the required amount of slurry is drawn off of the operating slurry supply train. In this manner, continuous agitation of the dilute slurry mixture in day tank 80 is provided to keep the slurry properly blended and prevent the agglomeration of large particle clusters. As previously discussed, the valve manifold box 90 may direct slurry from either the first supply train 21, the second supply train 22, or simultaneously from both supply trains 21, 22.

With continuing reference to FIG. 2, when the level of slurry reaches a predetermined level in day tank 80 (as measured, for example by level sensors or probes), the slurry system may automatically transfer additional dilute slurry from mixing tank 40 to replenish the depleted slurry supply in the day tank. Alternatively, the level sensor may trigger an alarm on low slurry level in day tank 80 and operating personnel may manually initiate the transfer of slurry from mixing tank 40 to the day tank 80 by pump-tank mixer 70. Furthermore, if additional slurry is not available in the dedicated mixing tank 40 for the particular slurry supply train 21 or 22 in service at the moment, the standby slurry supply train 21 or 22 may be placed into service to furnish the slurry needs of the CMP stations 100.

It will be appreciated that portions of slurry feed system 20 may be operated manually by personnel and/or automatically controlled via a conventional PLC in conjunction with conventional remote actuators, sensors, and other monitoring instrumentation such as pressure and temperature sensors or flowmeters.

According to another aspect of the invention, an improved slurry filter housing is provided. Filters are used in slurry feed systems for CMP operations to remove oversize, large slurry particles or agglomerated clusters or clumps of particles which might otherwise scratch and damage the wafer surface during polishing. Slurry pumps may create a large slurry shear forces which increase the distribution of oversize particles. Such particle clumps may form in various slurry storage or mixing tanks and in the piping system (particularly in dead flow legs when the slurry system is not pumping. These slurry filters are typically installed downstream of the slurry feed pumps 81 in piping upstream of the CMP stations 100 as a protective measure.

Figure 9:
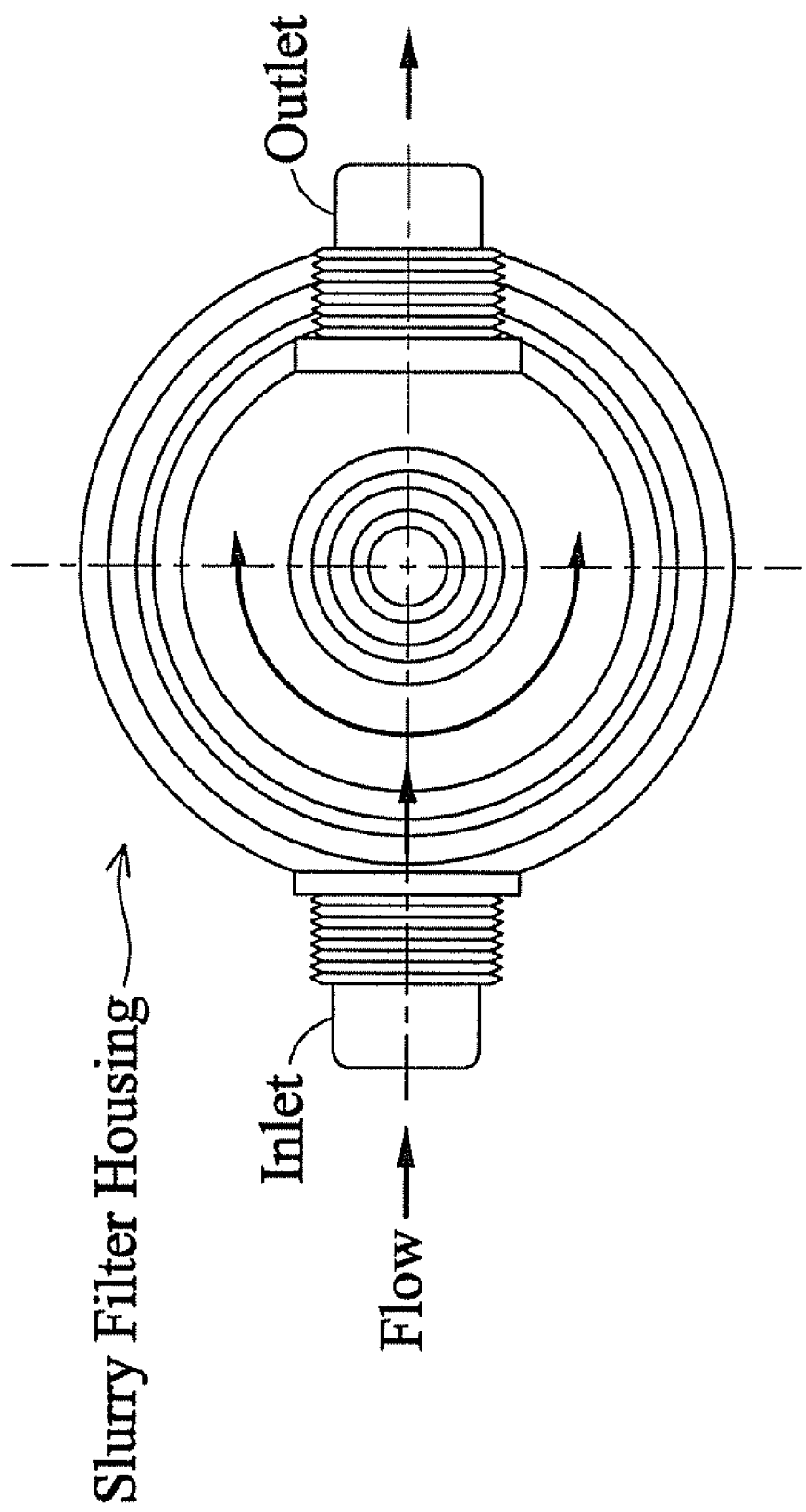
FIGS. 9 and 10 are top and side cross-sectional views of a known conventional slurry filter housing.
Figure 10:
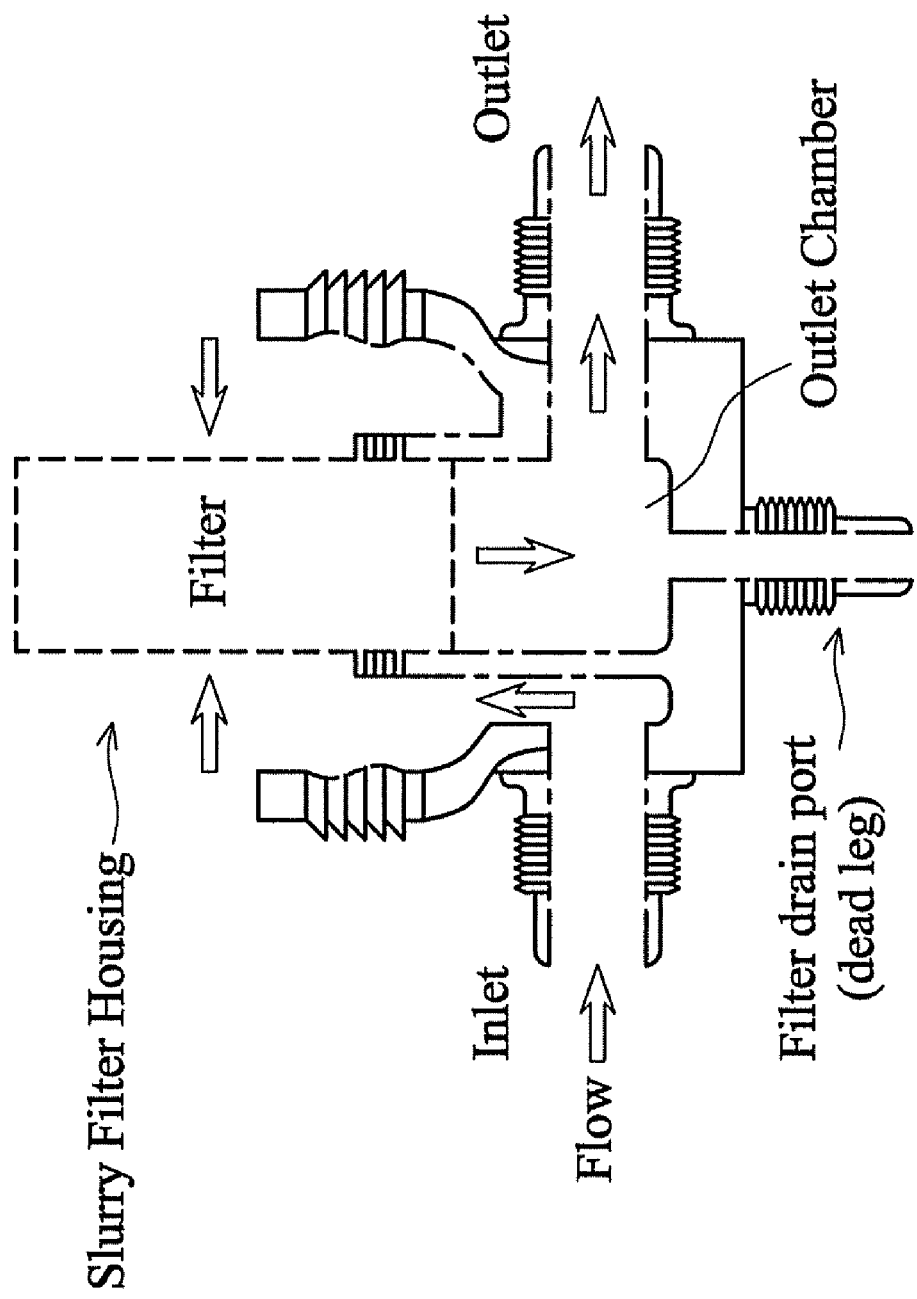

FIGS. 9 and 10 show an existing conventional slurry filter housing arrangement. The slurry flow enters the filter housing through an inlet nozzle and is split or bifurcated on each side of a central outlet chamber. The slurry then flows upwards and towards the center of the housing going through the filter, down into the outlet chamber, and finally outlet nozzle towards the CMP station. This existing design creates very turbulent flow causing a large pressure drop and excessive wear to filter components in the flow path and the filter. In addition, the drain port located at the bottom of the filter which is used to drain the filter for maintenance creates a flow dead zone which adversely affects slurry quality when conglomerated slurry particles become re-entraining in the slurry outlet flow.

Figure 11:
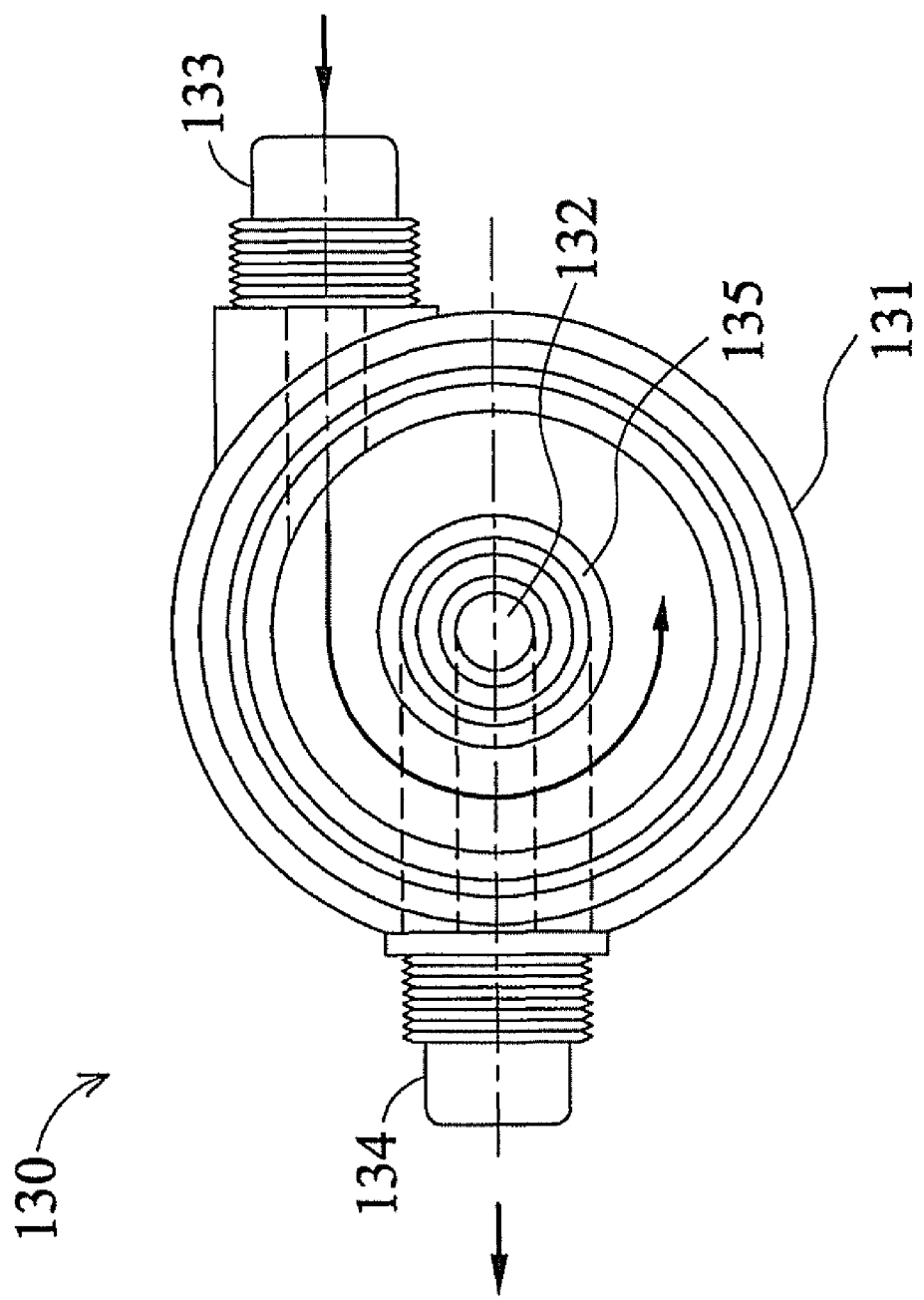
FIGS. 11 and 12 are top and side cross-sectional views of one embodiment of a slurry filter housing according to the present invention.
Figure 12:
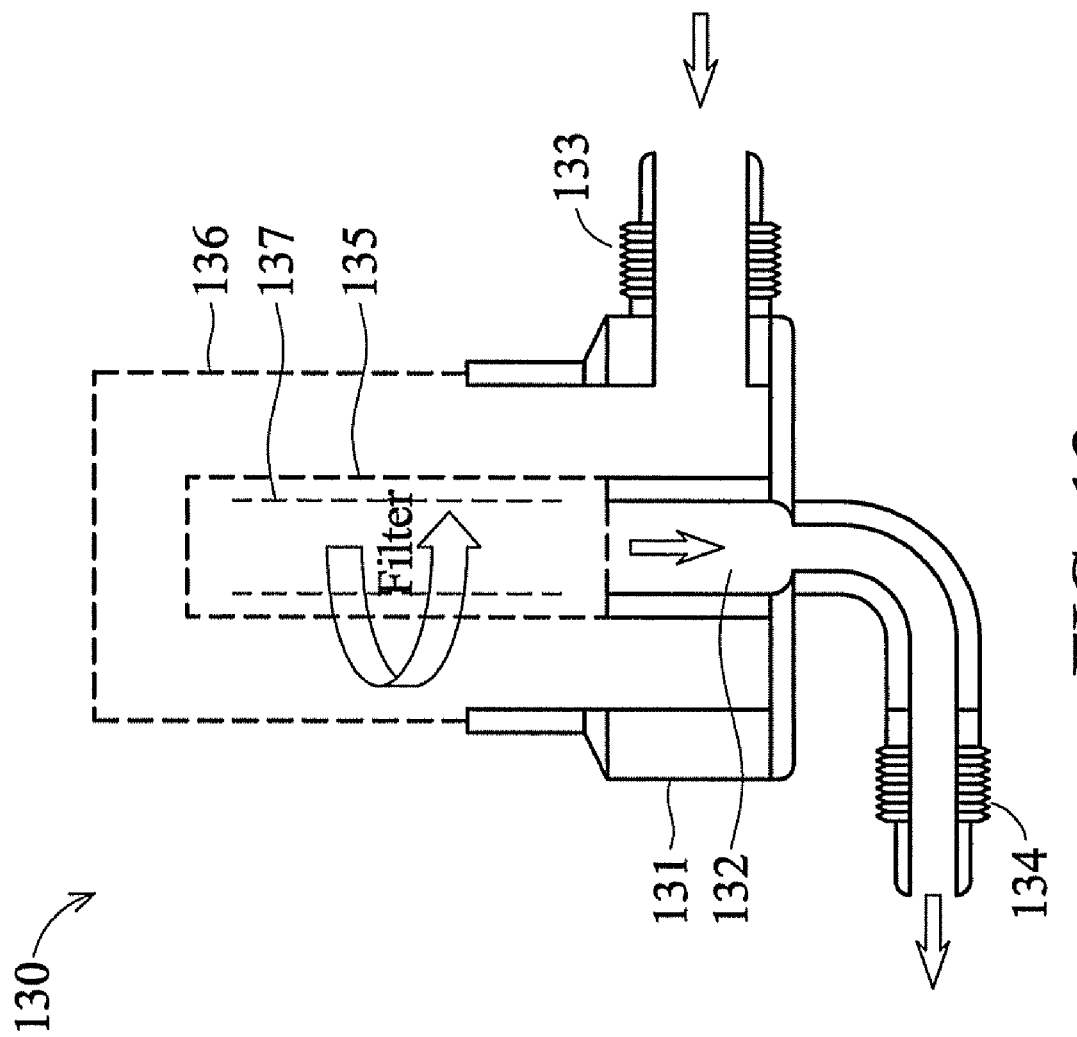

According to another aspect of the invention, an improved slurry filter housing is provided that reduces slurry shear force, wear, and pressure drop. FIGS. 11 and 12 show one possible embodiment of a slurry filter housing 130 according to the present invention. Slurry filter housing 130 includes a lower housing body 131 defining an internal cavity, central outlet chamber 132 for collecting filtered slurry, inlet nozzle 133, and outlet nozzle 134. Outlet chamber 132 preferably is cylindrical in shape in some embodiments and concentrically aligned with and positioned in body 131. A conventional removable cover 136 of any suitable configuration and size may be detachably connected to housing body 131 to provide access to the filter housing for periodic maintenance and replacement of filter 135 positioned within the housing.

Referring to FIGS. 11 and 12, filter 135 is preferably disposed at and temporarily sealed to the entrance to outlet chamber 132 to ensure all slurry entering filter housing 130 passes through the filter before existing. In one embodiment, filter 135 may be cylindrical in shape and presents a full 360 degree of filter media to the incoming slurry flow. Filter 135 may contain a central passageway 137 that fluidly communicates with outlet chamber 132 for collecting filtered slurry. Filter 135 may contain a conventional internal frame or a similar type frame may be provided with filter housing 130 (both not shown for clarity) to prevent the filter from collapsing under the pressure of the slurry flow and to maintain the shape of the central passageway 137.

With continuing reference to FIGS. 11 and 12, and as best shown in FIG. 11, slurry inlet nozzle 133 is laterally offset from the outlet nozzle 134 which is concentrically aligned with body 131 of filter housing 130 in one preferred embodiment. In contrast to existing filter housing configurations shown in FIGS. 9 and 10, slurry outlet nozzle 134 is located at the bottom of housing body 131 and fluidly communicates with the slurry outlet chamber 132 as shown. Advantageously, this arrangement eliminates the drain port of prior designs (see FIG. 10) and slurry flow dead zone, yet still provides a means for draining the slurry filter housing 130 to allow for periodic maintenance.

Referring to FIGS. 11 and 12, the offset positioning of slurry inlet nozzle 133 creates a less turbulent spiraling or circular slurry flow path (see flow arrows) within filter housing 130 thereby reducing pressure drop and slurry shear force. As slurry is introduced into housing body 131, the flow spirals and gradually moves upwards towards filter 135 passing radially inwards through the filter media and then downwards towards outlet chamber 132 and outlet nozzle 134 to CMP station 100 (see FIG. 2). Particle size distribution comparison tests performed between existing conventional slurry filter housings (FIGS. 9 and 10) and the new filter housing 130 design (FIGS. 11 and 12) according to the present invention advantageously showed a decrease in larger particle counts with the present filter housing. An example of a suitable filter media that may be used for filter 135 may be Planargard® Point-of-Use Cartridge Filters available from Mykrolis Corporation.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. In addition, numerous variations in the preferred or exemplary methods and processes described herein may be made without departing from the spirit of the invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A slurry feed system suitable for chemical mechanical planarization in a semiconductor fabrication facility, the system comprising:
    a valve manifold box comprising a plurality of valves and having a slurry discharge piping header fluidly connected to at least one chemical mechanical planarization station;
    a first slurry supply train comprising a first slurry mixing tank for preparing dilute slurry, a first day tank fluidly connected to the first mixing tank by first mixing tank discharge piping, at least two first slurry feed pumps arranged in series pumping relationship and connected by first pump suction piping to the first day tank, first pump discharge piping routed from the first slurry feed pumps to the valve manifold box, and first slurry return piping routed from the valve manifold box to the first day tank, the first pump discharge piping and first slurry return piping defining a first slurry piping loop, wherein the valves in the valve manifold box are interconnected with the first slurry piping loop in a manner that operably supplies slurry from the first slurry piping loop to the chemical mechanical planarization station;
    wherein a suction of one of the at least two first slurry feed pumps is fluidly coupled to a discharge of the other slurry feed pump which takes suction from the first day tank, the at least two first slurry feed pumps being disposed upstream of the valve manifold box in the first slurry supply train.

2. The system of claim 1, further comprising a second slurry supply train comprising a second slurry mixing tank for preparing dilute slurry, a second day tank fluidly connected to the second mixing tank by second mixing tank discharge piping, at least two second slurry feed pumps arranged in series pumping relationship and connected by second pump suction piping to the second day tank, second pump discharge piping routed from the second slurry feed pumps to the valve manifold box, and second slurry return piping routed from the valve manifold box to the second day tank, the second pump discharge piping and second slurry return piping defining a second slurry piping loop, wherein the valves in the valve manifold box are interconnected with the second slurry piping loop in a manner that operably supplies slurry from the second slurry piping loop to the chemical mechanical planarization station;
    wherein the first mixing tank includes a first pump-tank mixer coupled to the bottom of the mixing tank, the first pump-tank mixer being operable to pump slurry from the first mixing tank to the first day tank via the first mixing tank discharge piping and further being operable to agitate the contents of the first mixing tank by returning at least some the slurry back into the first mixing tank.

3. The system of claim 2, wherein the valves in the valve manifold box are configured and arranged to supply slurry from either the first or second slurry piping loops to the chemical mechanical planarization station, or supply slurry from both the first and second slurry piping loops to the chemical mechanical planarization station.

4. The system of claim 3, wherein the valve manifold box includes a first isolation valve disposed between the first slurry piping loop and the slurry discharge piping header, and a second isolation valve disposed between the second slurry piping loop and the slurry discharge piping header, wherein alternatingly opening and closing the first and second isolation valves allows a user to select a source of slurry for the at least one chemical mechanical planarization station.

5. The system of claim 4, wherein the first isolation valve is open and the second isolation valve is closed to select the first slurry piping loop as the source of slurry for the at least one chemical mechanical planarization station.

6. The system of claim 1, further comprising a measuring tank in fluid communication with the first mixing tank and having a user adjustable volumetric capacity, the measuring tank receiving a liquid selected from the group consisting of deionized water, undiluted slurry, and a chemical.

7. The system of claim 6, wherein the measuring tank includes a reservoir and a movable bottle disposed inside the measuring tank, the bottle being adjustable upwards or downwards in position and operable to displace a volume of liquid to vary the volumetric capacity of the measuring tank.

8. The system of claim 7, wherein the bottle is attached to a threaded rod that is rotatable by a user to adjust the position of the bottle.

9. The system of claim 1, wherein the first mixing tank includes a first pump-tank mixer coupled to the bottom of the mixing tank, the first pump-tank mixer being operable to pump slurry from the first mixing tank to the first day tank via the first mixing tank discharge piping and further being operable to agitate the contents of the first mixing tank by returning at least some the slurry back into the first mixing tank.

10. The system of claim 9, wherein the first pump-tank mixer includes an inlet taking suction from the first mixing tank and a rotatable impeller, the impeller producing pressurized agitation jets of slurry directed back into the first slurry mixing tank.

11. The system of claim 1, wherein the first mixing tank includes slurry recirculation piping arranged to return slurry from the first mixing tank discharge back to the first mixing tank and monitoring instrumentation for confirming the quality of the slurry in the first mixing tank discharge.

* * * * *